Patented Jan. 9, 1951

2,537,309

UNITED STATES PATENT OFFICE 2,537,309

NITRATION OF DIARYL ETHANE

Edward L. Kropa, Old Greenwich, and John J. Roemer, Stamford, Conn., assignors to American Cyanamid Company, New York, N. Y., a corporation of Maine No Drawing. Application November 5, 1948, Serial No. 58,606

4 Claims. (Cl. 260—645)

This invention relates to new chemical compounds and to processes of preparing them. More particularly, the invention relates to nitrated diaryl ethanes.

The compounds of the present invention may be represented by the following general formula:

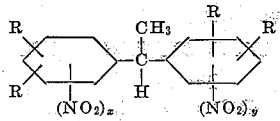

where R is hydrogen or a methyl group, $x$ is selected from the group consisting of zero, one and two and $y$ is selected from the group consisting of one and two. They are prepared by any suitable nitration process such as, for example, that described for nitrating toluene on page 37 of the book "Reactions of Organic Compounds" by Hickinbottom.

The invention will be described in greater detail in conjunction with the following specific examples in which the proportions are given in parts by weight. It should be understood, of course, that the examples are merely illustrative and that the scope of the invention should not be limited to the details therein set forth.

Example 1

36 parts of diphenyl ethane
108 parts of acetic anhydride
24 parts of copper nitrate trihydrate The diphenyl ethane is dissolved in the acetic anhydride and the copper nitrate trihydrate is added very slowly to the mixture which is maintained at 25–30° C. After all of the copper nitrate has been added, the reaction mixture is poured into water and an organic liquid layer separates. This is mononitro diphenyl ethane.

Example 2

20 parts of nitric acid (specific gravity 1.42)
30 parts of concentrated sulfuric acid
45.7 parts of ditolyl ethane The nitric and sulfuric acids are mixed together and cooled, and the mixture is slowly added to the ditolyl ethane with stirring and suitable cooling to maintain the temperature at about 30° C. When all the acid has been added, the temperature is gradually raised to about 50° C. and maintained at this point for about one hour. The reaction mixture is then cooled, the acid is removed, and the mononitro ditolyl ethane so obtained is washed successively with water, dilute sodium carbonate solution, and more water. The product so obtained melts at 113°–114° C. and has a nitrogen content of 5.47% and 5.65% on two analyses. The theoretical nitrogen content for mononitro ditolyl ethane is 5.49%.

Example 3

60 parts of concentrated nitric acid
138 parts of concentrated sulfuric acid
7 parts of ditolyl ethane A mixture of the concentrated nitric acid and 92 parts of the sulfuric acid is prepared. 15 parts of this mixture of acids are then mixed with the remaining 46 parts of concentrated sulfuric acid, and the resulting mixture is cooled to about 0° C. The ditolyl ethane is added to this cooled mixture. After reaction is complete the reaction mixture is drowned in ice water, and the crystalline product which separates is filtered and recrystallized from acetone-alcohol solution. It has a melting point of 191°–194.5° C. and contains 14.18% and 14.44% nitrogen on two analyses. The theoretical nitrogen content for tetranitro ditolyl ethane is 14.36%.

Analogous nitro derivatives of dixylyl ethane and of mixed diaryl ethanes such as phenyl tolyl diethane, tolyl xylyl diethane, etc., are prepared by following the procedures of the examples.

The diaryl ethanes used in the examples may be readily prepared by reaction of the appropriate aromatic hydrocarbon, i. e., benzene, toluene, or xylene with acetaldehyde in the presence of hydrogen fluoride as described in U. S. Patent No. 2,439,228 or in the presence of a mixture of hydrogen fluoride and fluosulfonic acid as described in the copending application of Woodrow Ernest Kemp, Serial No. 771,154 filed August 28, 1947. Moreover, if desired, one mol of benzene and one mol of toluene can be reacted with one mol of acetaldehyde according to either of the above processes in order to obtain the corresponding asymmetrical phenyl tolyl ethane which may alternatively be prepared by reacting styrene with toluene in the presence of sulfuric acid. The present invention contemplates mono-, di-, tri-, and tetra-nitro diphenyl ethanes, ditolyl ethanes, dixylyl ethanes, and the various mixed diaryl ethanes containing phenyl, tolyl or xylyl groups. The extent of nitration is, of course, controlled by varying the method of nitration, the strength of the nitrating agent, the temperature of nitration, the relative proportions of nitrating agent used, the duration of the nitration reaction, and the like.

The nitro derivatives of the present invention may be cracked catalytically in accordance with processes such as those described in U. S. Patents Nos. 2,373,982; 2,420,688; 2,420,689; 2,422,163; 2,422,164; 2,422,165; 2,422,169; 2,422,171; and 2,422,318. The unsymmetrical compounds crack more readily than do the symmetrical compounds. Thus, mononitro diphenyl ethane readily produces nitrostyrene.

The nitro derivatives of the present invention may be reduced to the corresponding amino compounds. If a polynitro compound is the starting material, intermediate nitramines are formed. By cracking the amino compounds, and particularly the unsymmetrical compounds such as monoamino diphenyl ethane, vinyl aniline may be formed. Vinyl aniline or amino styrene, isomers are useful in the preparation of unsaturated isocyanates as described in the copending application of Edward L. Kropa, one of the present inventors, and Arthur S. Nyquist, Serial No. 741,956, filed April 16, 1947, now U. S. Patent No. 2,468,713. The amino compounds may also be diazotized and variously substituted by reaction through the diazo group. Thus, they are particularly suited to the production of dyestuffs.

We claim:

1. A 1,1-nitrodiarylethane having the following general formula:

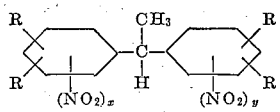

where R is selected from the group consisting of hydrogen and methyl groups, $x$ is selected from the group consisting of zero, 1 and 2, and $y$ is selected from the group consisting of 1 and 2.

2. 1,1-mononitroditolylethane having the following formula:

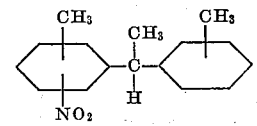

3. 1,1 - mononitrodiphenylethane having the following formula:

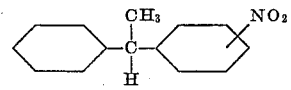

4. 1,1-tetranitroditolylethane having the following formula:

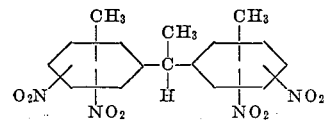

EDWARD L. KROPA.
JOHN J. ROEMER.

REFERENCES CITED

The following references are of record in the file of this patent:

UNITED STATES PATENTS

| Number | Name | Date |
|---|---|---|
| 1,954,377 | Calcott et al. | Apr. 10, 1934 |
| 2,034,491 | Sloan | Mar. 17, 1936 |

FOREIGN PATENTS

| Number | Country | Date |
|---|---|---|
| 39,381 | Germany | Apr. 14, 1887 |